(12) United States Patent
McCarthy

(10) Patent No.: US 9,909,611 B2
(45) Date of Patent: Mar. 6, 2018

(54) THUMB TAB ACTUATOR FOR SLING SNAPHOOK

(71) Applicant: Kevin McCarthy, Bend, OR (US)

(72) Inventor: Kevin McCarthy, Bend, OR (US)

(73) Assignee: Sly Tactical, L.L.C., Windsor, CA (US)

( * ) Notice: Subject to any disclaimer, the term of this patent is extended or adjusted under 35 U.S.C. 154(b) by 348 days.

(21) Appl. No.: 14/636,483

(22) Filed: Mar. 3, 2015

(65) Prior Publication Data
US 2015/0292835 A1 Oct. 15, 2015

Related U.S. Application Data

(60) Provisional application No. 61/995,495, filed on Apr. 10, 2014.

(51) Int. Cl.
F16B 45/00 (2006.01)
F16B 45/02 (2006.01)
F41C 23/02 (2006.01)
F41C 33/00 (2006.01)

(52) U.S. Cl.
CPC ............ *F16B 45/02* (2013.01); *F41C 23/02* (2013.01); *F41C 33/002* (2013.01)

(58) Field of Classification Search
CPC ........ F41C 23/02; F41C 33/002; F16B 45/02; F16B 45/00; B66C 1/36; Y10T 24/4512; Y10T 24/45236; Y10T 24/45272; Y10T 24/45649; Y10T 24/45639; Y10T 24/45696; Y10T 24/45785; Y10T 24/4755
See application file for complete search history.

(56) References Cited

U.S. PATENT DOCUMENTS

| 1,292,875 | A | * | 1/1919 | Randall | F41C 33/002 224/150 |
| 3,831,229 | A | * | 8/1974 | Craven | B64D 17/32 24/599.8 |
| 4,621,851 | A | | 11/1986 | Bailey, Jr. | |
| 7,093,330 | B2 | | 8/2006 | Ferguson et al. | |

* cited by examiner

Primary Examiner — Jack W Lavinder
(74) Attorney, Agent, or Firm — Forge IP, PLLC

(57) ABSTRACT

A thumb tab actuator for a firearm sling snap-hook is provided. The thumb tab actuator includes a body having a surface that engages a lever of a snap-hook that pivots in a first plane. The actuator body is adapted to be removably mounted to the lever, and the body includes a tab extending outwardly in a second plane transverse to the first plane when the body is mounted to the lever, such that the lever pivots in response to a force exerted on the tab. A user may couple the thumb tab to the snap-hook via a screw or other fastener. In some embodiments, the thumb tab includes a second tab for an ambidextrous configuration.

18 Claims, 20 Drawing Sheets

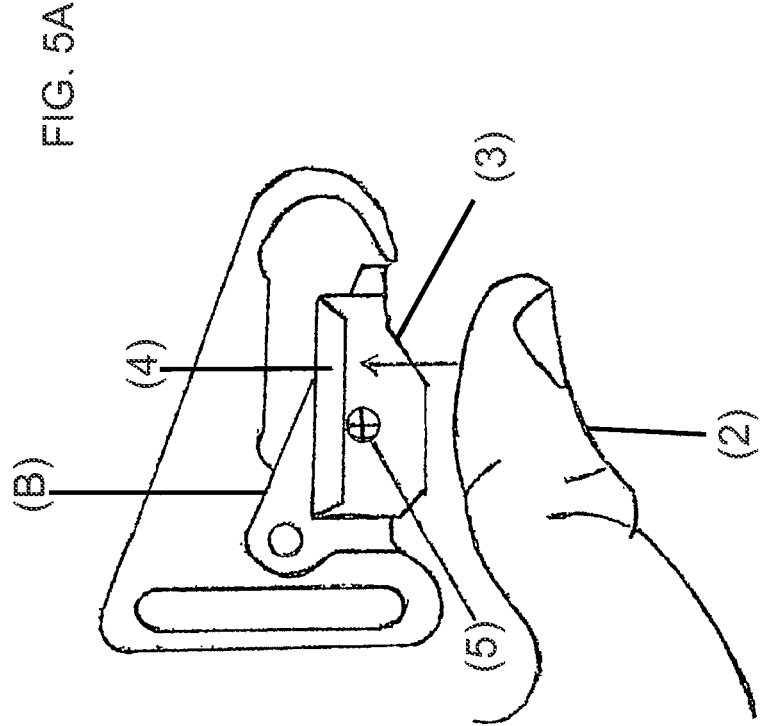

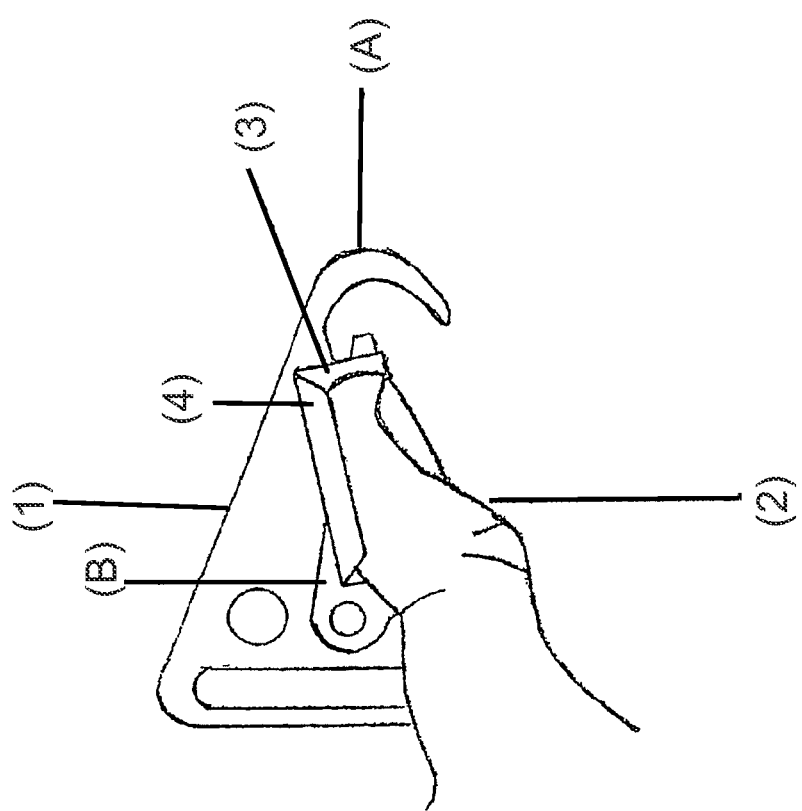

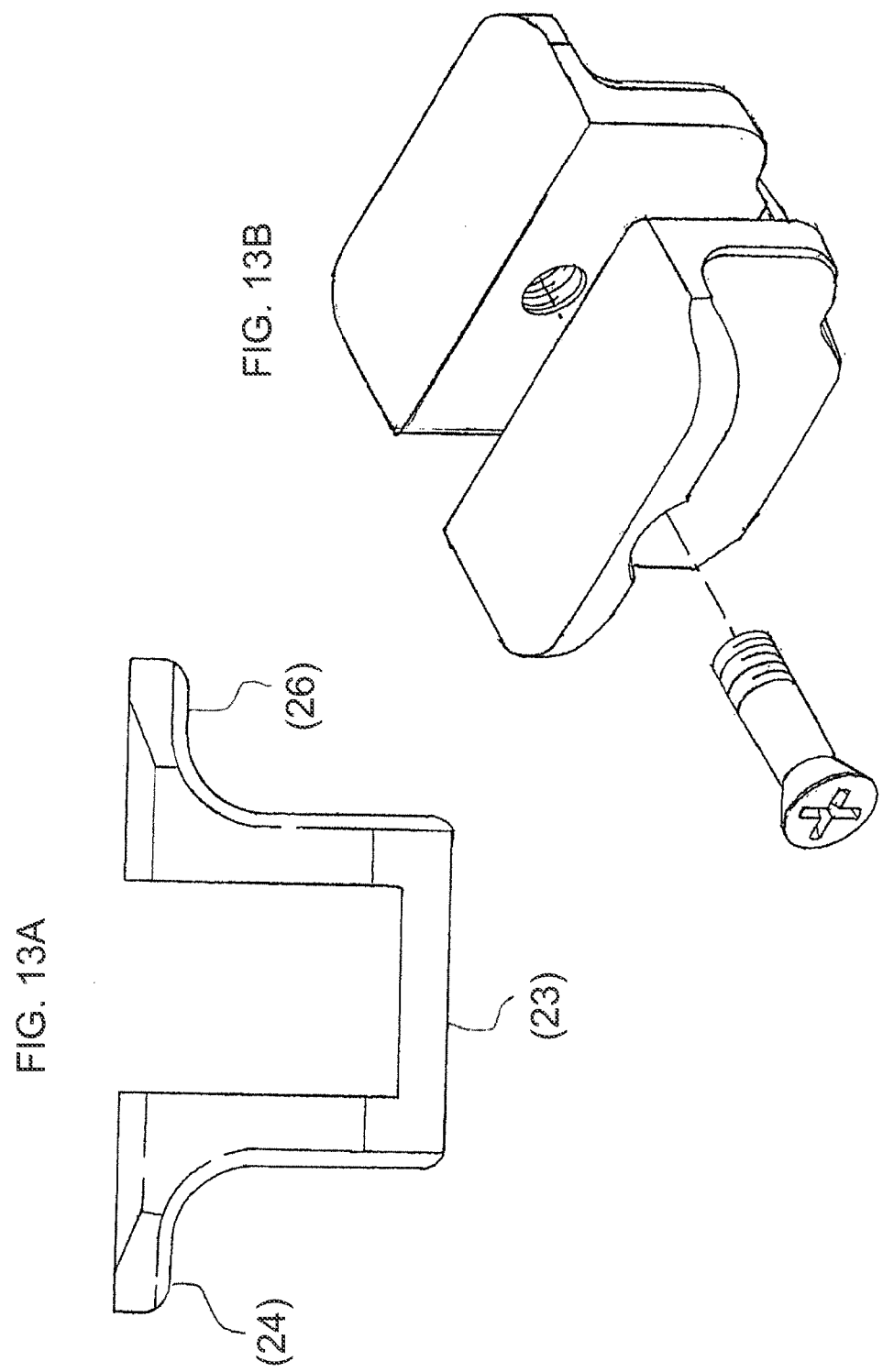

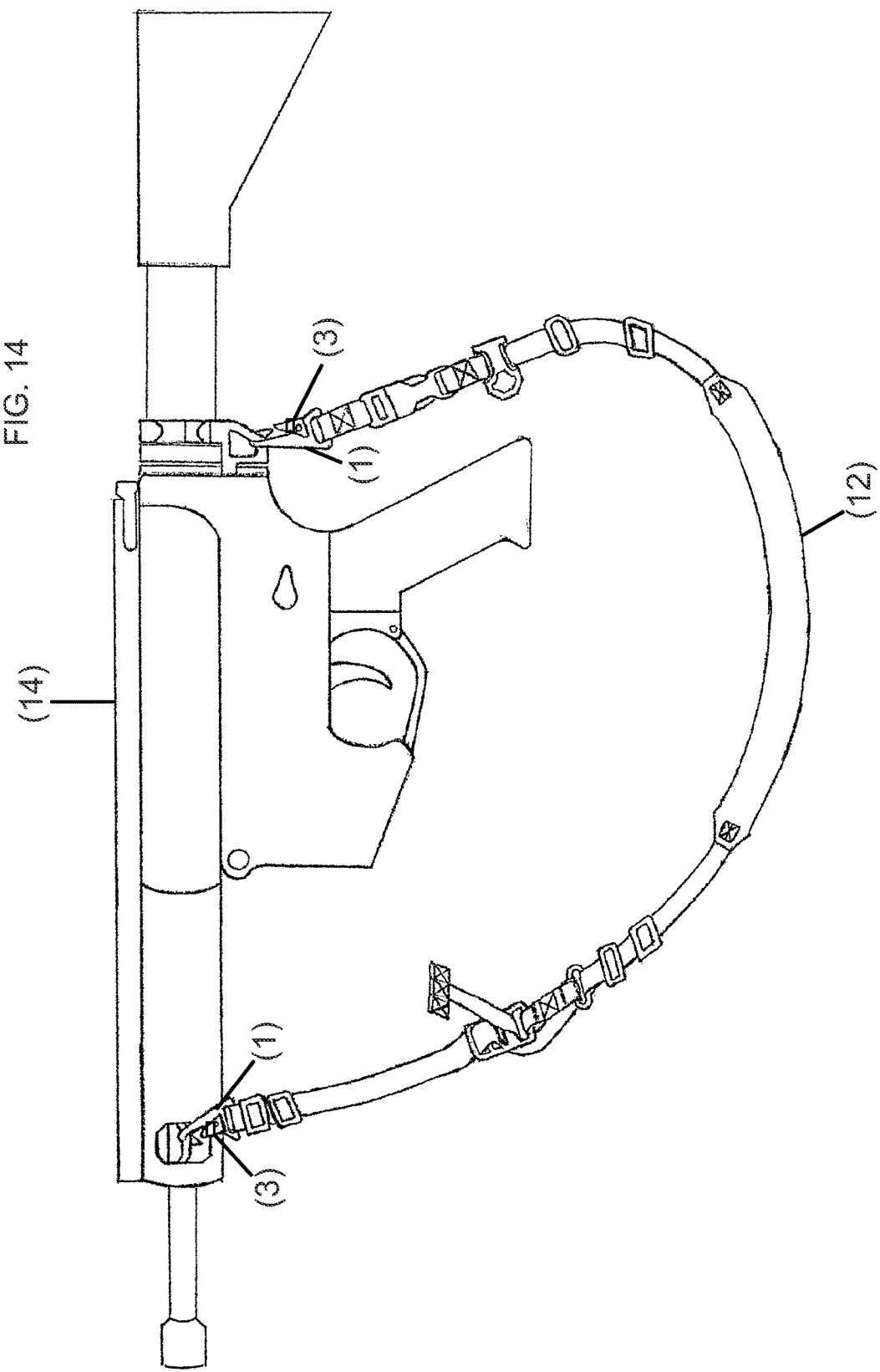

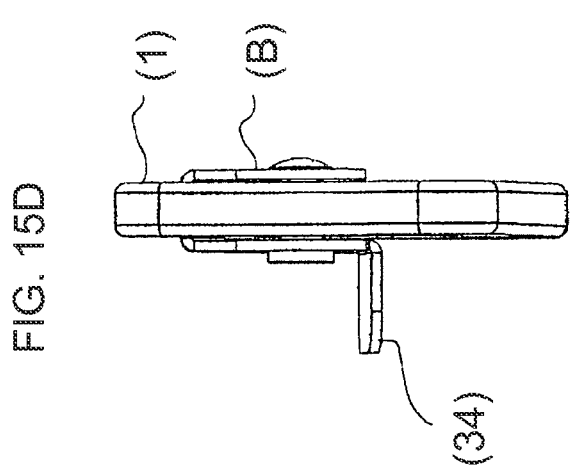

THUMB TAB ACTUATOR FOR SLING SNAPHOOK

FIELD OF THE INVENTION

The present invention relates to the field of attaching slings to weapons, and more particularly, relates to snaphooks for hooking the slings onto firearms.

BACKGROUND OF THE INVENTION

Snap-hooks are used for a variety of purposes. A snaphook usually includes a hook and a lever (or gate) that opens and closes to form a loop with the hook. The lever typically includes a spring that compresses when a user applies pressure in order to open the snap-hook. When the user releases the pressure, the lever returns to a closed position and the loop re-forms with the hook. This ensures that the snap-hook will remain closed and locked, and will not inadvertently open, causing the snap-hook to disengage from whatever object to which the snap-hook has been latched.

One common use of snap-hooks is to secure a sling to a weapon. Slings provide a way for users to more easily carry and retain a weapon in an active environment. In an active environment, the user wants to be certain that the sling will not become detached from the weapon. Therefore, heavy duty snap-hooks, such as the HK style snap-hook, that have strong internal springs to keep the lever closed and locked without user pressure are preferred. However, there are times when a user may find that the snap-hook needs to be opened rapidly to unlatch from a particular loop. Since the HK style snap-hook has a strong spring holding it closed, a user may have some difficulty opening it.

Traditionally, the design of the HK style snap-hook allows the user to open the snap-hook's lever by pressing on the bottom of the lever with his or her thumb. The user's thumb will sometimes interfere with the hook of the snap-hook when latching or unlatching from loop style attachments, due to the small clearance area between the hook and the lever. This interference slows the lever's opening and reduces efficiency. The snap-hook lever is also narrow, which further increases the difficulty of opening the snaphook. When carrying a weapon it is also very common for weapon users to wear gloves that increase the amount of thumb surface area that can interfere with the latching or unlatching process. Glove material can also catch on the lever or hook, causing further delay.

What is desired, therefore, is a snap-hook that may be opened or closed by a user rapidly and efficiently that also limits the chances for a user's thumb and/or a glove's fabric to get caught in between the snap-hook and the gate. What is essentially desired is a thumb actuator located outside the area in which the lever moves so that a thumb can apply pressure to open the lever while remaining out of the way of the lever and hook of the snap-hook.

SUMMARY OF THE INVENTION

In order to overcome the deficiencies of the prior art and to achieve the objects and advantages listed, the invention comprises a thumb tab actuator including a body having a surface that engages a lever of a snap-hook that pivots in a first plane, wherein the body is adapted to be removably mounted to the lever, and wherein the body includes a tab extending outwardly in a second plane transverse to the first plane when the body is mounted to the lever, such that the lever pivots in response to a force exerted on the tab.

In certain advantageous embodiments, the extending tab is substantially perpendicular to the first plane.

In some embodiments, the surface for engaging a lever of the snap-hook is substantially U-shaped. In other embodiments, it is substantially V-shaped, while in others, it is concave.

In some embodiments, the body includes at least one aperture that aligns with at least one aperture of the lever when mounted thereto for accommodating at least one fastener to secure the thumb tab actuator to the lever. In some of these cases, the at least one aperture of the thumb tab is oriented in a vertical plane substantially parallel to the first plane. In certain embodiments, the thumb tab actuator further includes a fastener that passes through the apertures of the body and the lever to secure the thumb tag actuator to the lever, the fastener comprising a 4-40×7/16" phillips head screw. In some cases, the body includes a plurality of apertures for accommodating fasteners. In some of embodiments, the aperture is substantially centrally located on the body such that the body is mountable to the lever with the tab extending outwardly from the first plane on either side thereof.

In certain advantageous embodiments, the body includes a first side and a second side, and the tab is a first tab extending outwardly from the first side of the body, and the thumb tab actuator includes a second tab extending outwardly from the second side of the body transverse to the first plane when the body is mounted to the lever. In some of these embodiments, the second tab is substantially perpendicular to the first plane.

In some cases, the body comprises aluminum, and in others, it comprises stainless steel. In certain cases, the tab is integrally formed with the body.

In some embodiments, the invention includes a snaphook that engages the lever with the thumb tab actuator mounted thereto, wherein the lever engages the hook when in a closed position, and wherein the lever pivots relative to the hook to an open position in response to a force exerted on the tab. In some cases, the snap hook includes a first end and a second end, wherein the hook is located at the first end of the snap-hook, and the second end of the snap-hook is connected to a firearm sling.

In some embodiments, the first end of the snap hook is coupled to a firearm, which in some cases, is a rifle.

BRIEF DESCRIPTION OF THE DRAWINGS

FIGS. 5A-B are side views of the HK style snap-hook and thumb tab actuator of FIG. 4, illustrating the operation of the lever of the snap-hook via the thumb tab.

FIG. 13A is a front view of the thumb tab actuator of FIG. 12 with an ambidextrous configuration.

FIG. 13B is an exploded perspective view of the thumb tab actuator of FIG. 13A.

FIG. 14 is a sling coupled to a rifle with a snap hook including the thumb tab actuator of FIG. 3.

FIGS. 15A-E are perspective views of the thumb tab actuator integrally formed with a snap hook.

DETAILED DESCRIPTION OF THE INVENTION

Figure 1:
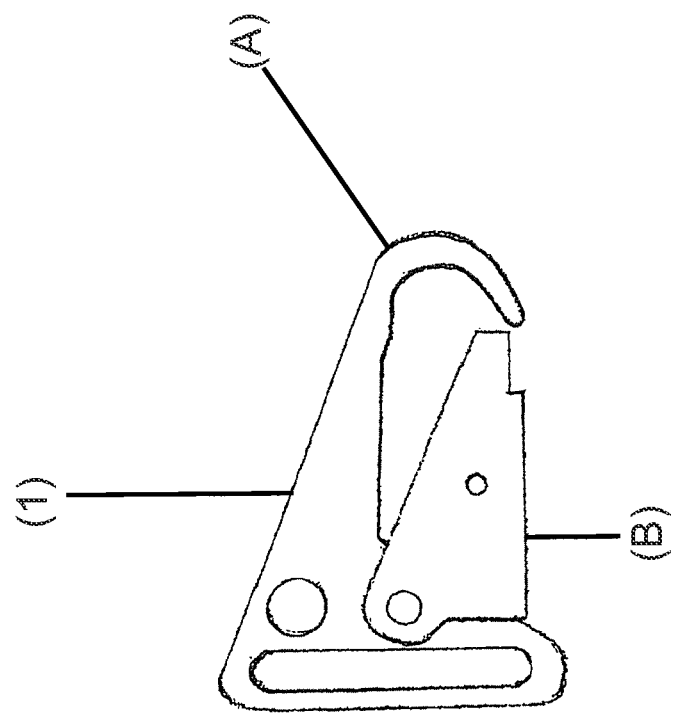
FIG. 1 is a side view of an HK style snap-hook as found in the prior art.

The basic components of one embodiment of a rear sling mount in accordance with the invention are illustrated in FIG. 1. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

Figure 2:
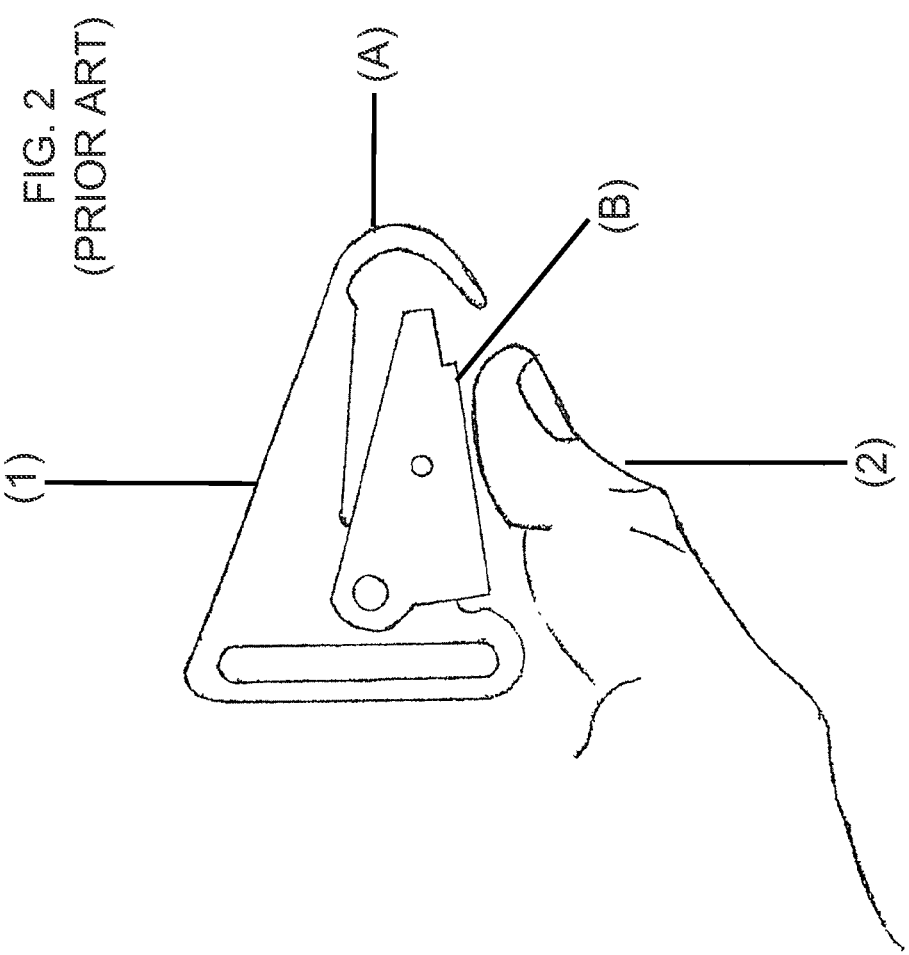
FIG. 2 is a side view of the HK style snap-hook of FIG. 1, illustrating the location of a thumb in order to apply pressure to the lever of the snap-hook.

As shown in FIGS. 1-2, a prior art snap-hook (1) includes a hook (A) and a tapered lever (B) pivotally attached to the hook (A). The lever may be also referenced as a gate or a push gate. In a closed or locked position, as shown in FIG. 1, the hook (A) and the lever (B) form a loop. A user opens the snap-hook (1) by exerting a force on the lever (B) such that the lever pivots away from the hook (A), breaking the loop formed by the hook (A) and the lever (B).

Traditionally, a user puts pressure on the lever (B) via a thumb (2) near the tapered end of the lever (B), as shown by FIG. 2. To close and lock the snap-hook (1), the user must release the pressure on the lever (B) imparted by the user's thumb (2). A snap-hook (1) of this type further includes a spring (not shown) located within the lever (B). When the user releases the pressure on the lever (B), the spring causes the lever (B) to quickly return or snap back to the closed position. The snap-hook (1) may be latched to another hook, loop or ring (not shown) to secure the snap-hook (1) as the user desires.

The traditional method of using a thumb (2) to open the snap-hook (1) leaves only a small clearance distance between the thumb (2) and the hook (A). As such, a user's thumb (2) can hinder the latching or unlatching process to an outside hook, loop, or ring. Furthermore, a common use of HK style snap-hooks (1) is for a user to secure a sling to a weapon in a military or law enforcement operation. Military or law enforcement users frequently wear gloves, which add more surface area to hinder the latching or unlatching process. Glove material can also catch on a thin or jagged edge of the lever (B).

Figure 3:
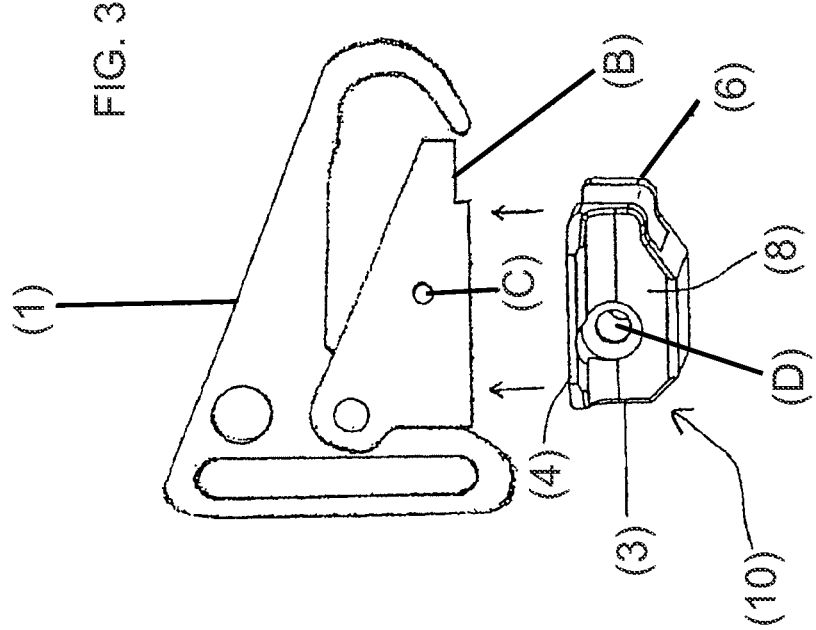
FIG. 3 is a side view of the HK style snap-hook of FIG. 1, with a thumb tab actuator in accordance with the present invention, in a disassembled state.
Figure 4:
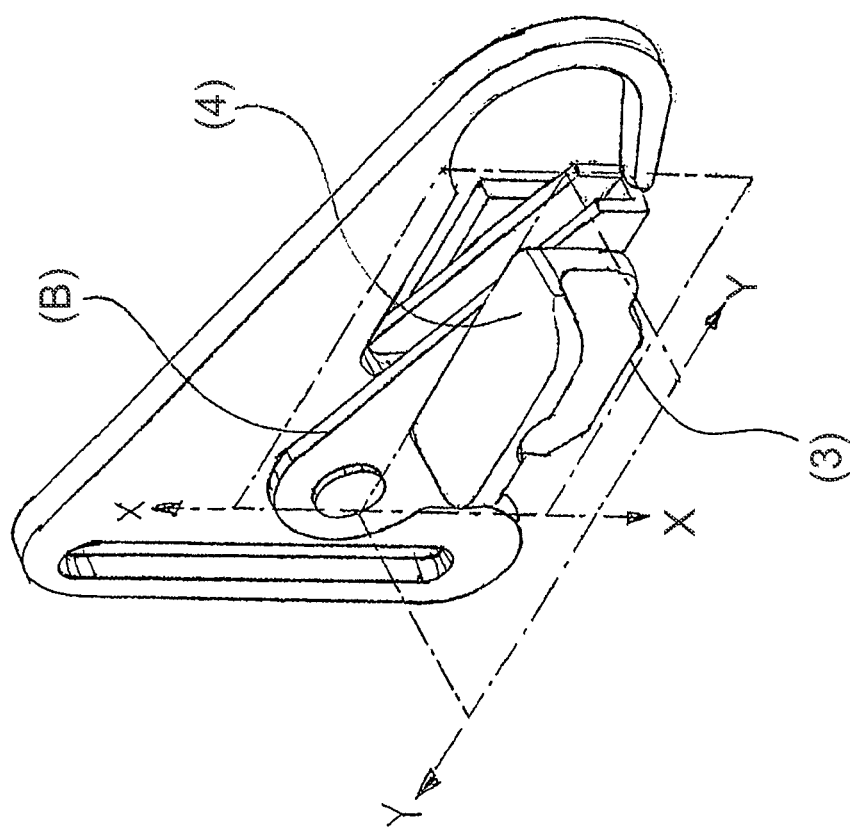
FIG. 4 is a perspective view of the HK style snap-hook and thumb tab actuator of FIG. 3 in an assembled state.
Figure 6:
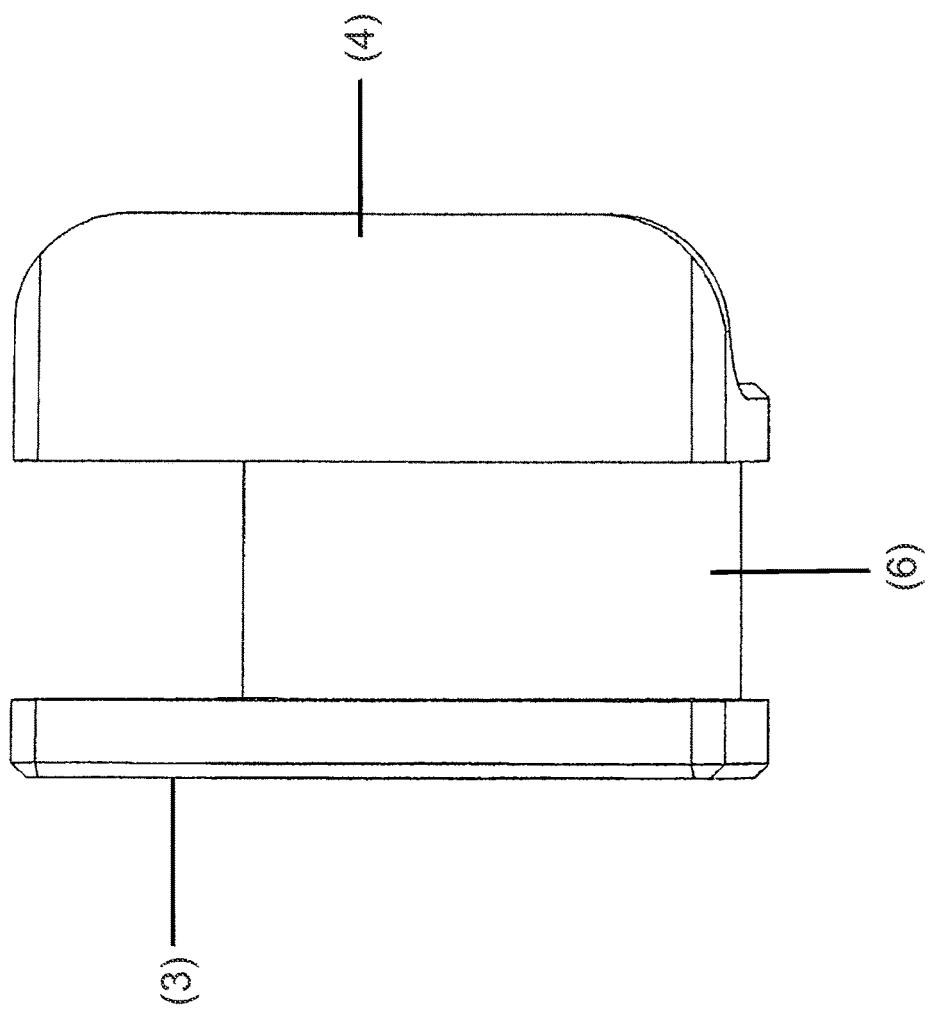
FIG. 6 is a top view of the thumb tab actuator of FIG. 3.
Figure 7:
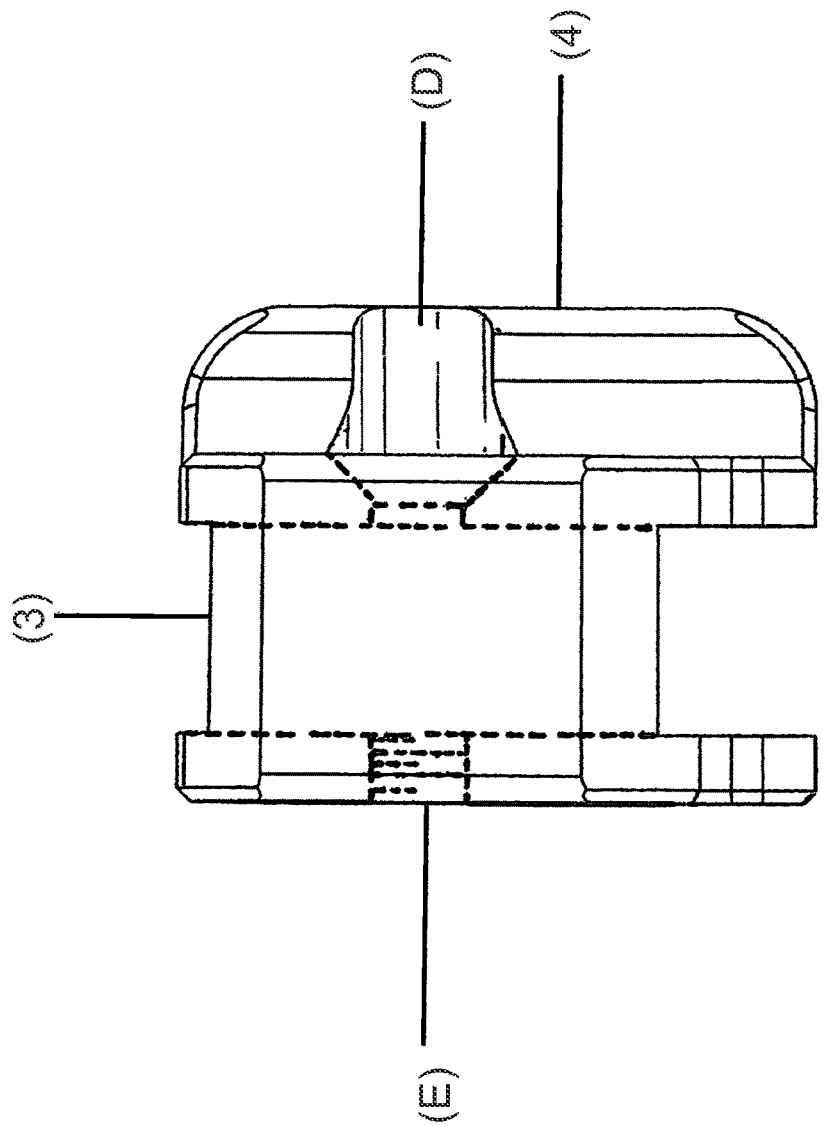
FIG. 7 is a bottom view of the thumb tab actuator of FIG. 3.
Figure 8:
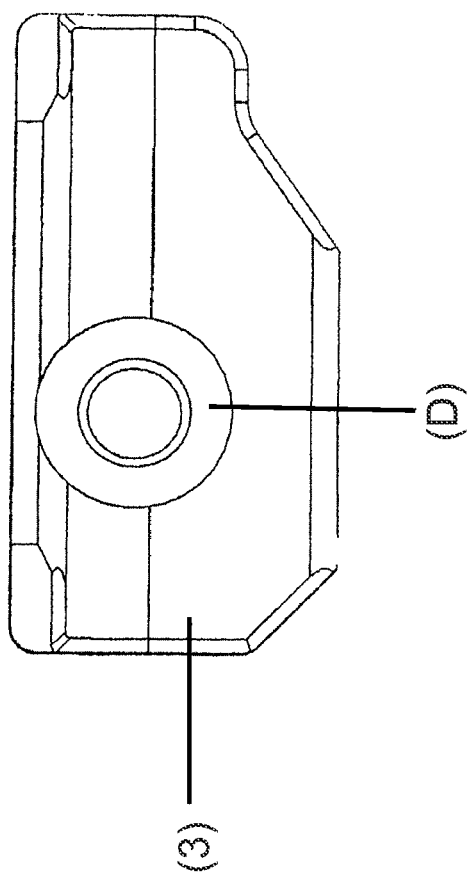
FIG. 8 is a right side view of the thumb tab actuator of FIG. 3.
Figure 9:
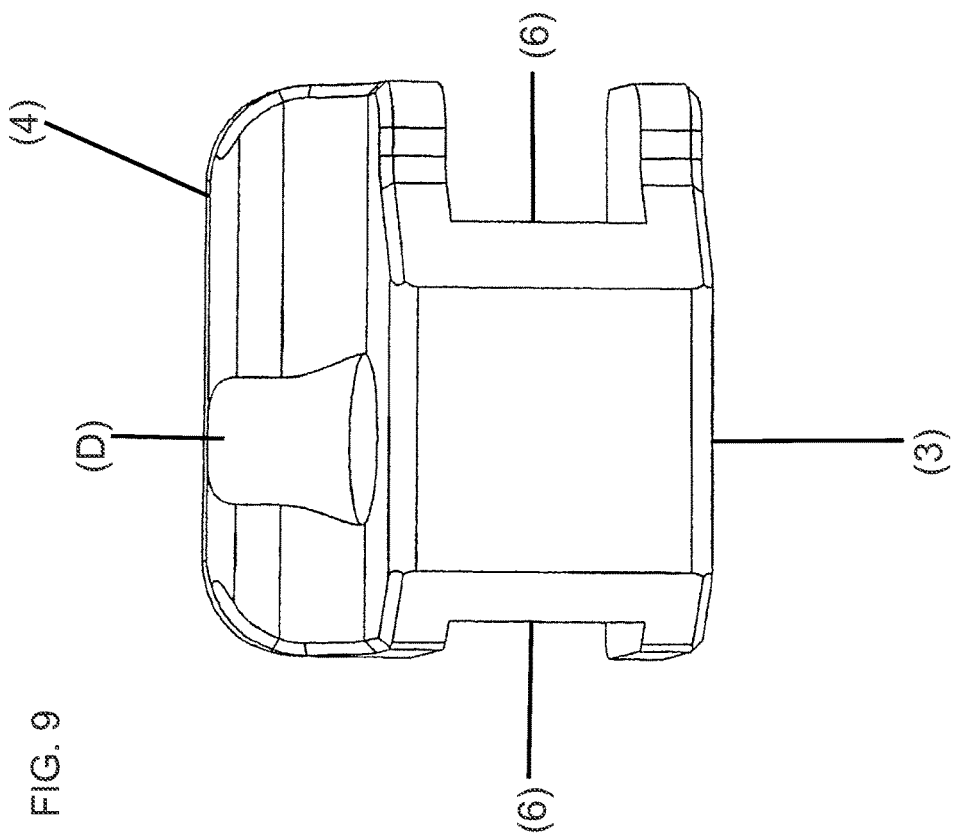
FIG. 9 is a bottom, perspective view of the thumb tab actuator of FIG. 3.
Figure 10:
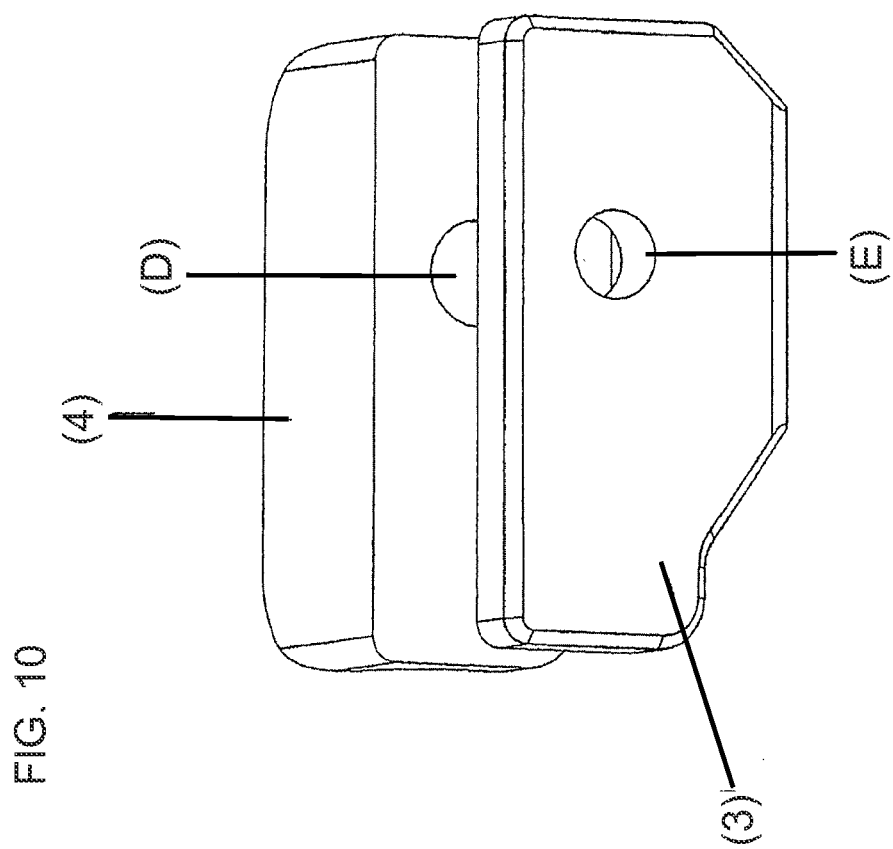
FIG. 10 is a side, perspective view of the thumb tab actuator of FIG. 3.
Figure 11:
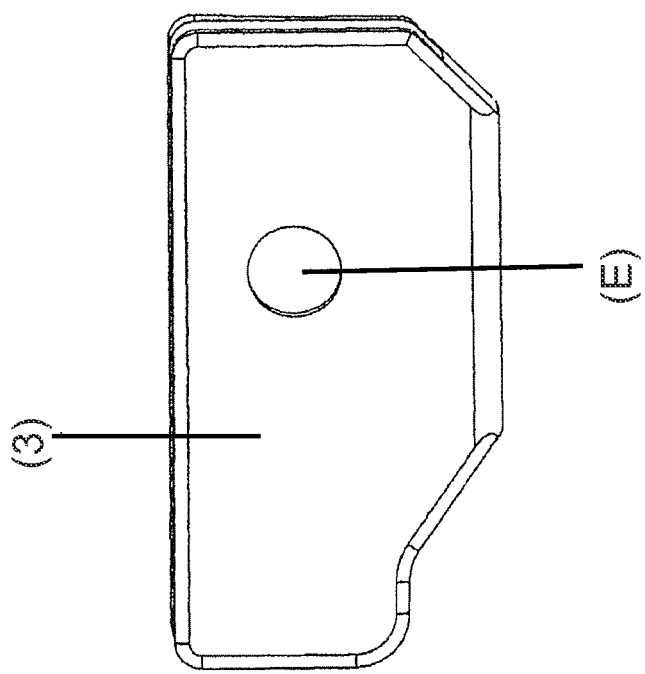
FIG. 11 is a left side view of the thumb tab actuator of FIG. 3.
Figure 12:
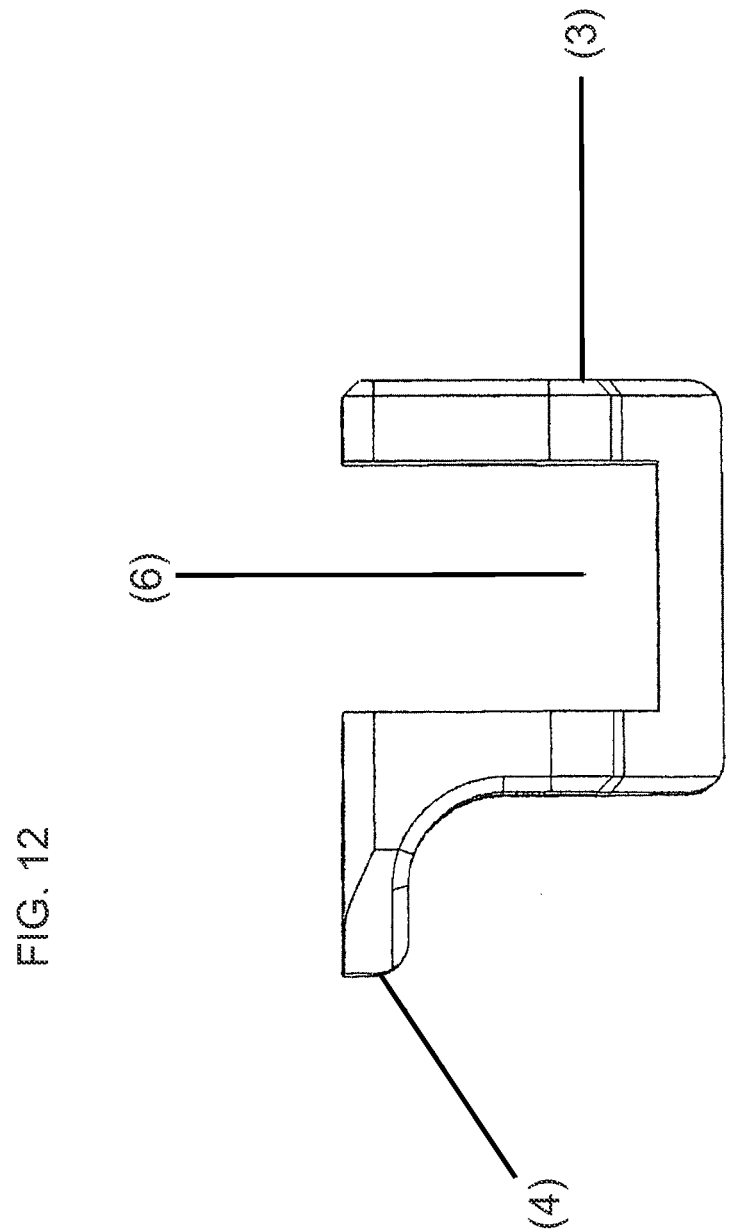
FIG. 12 is a front view of the thumb tab actuator of FIG. 3.
Figure 15A:
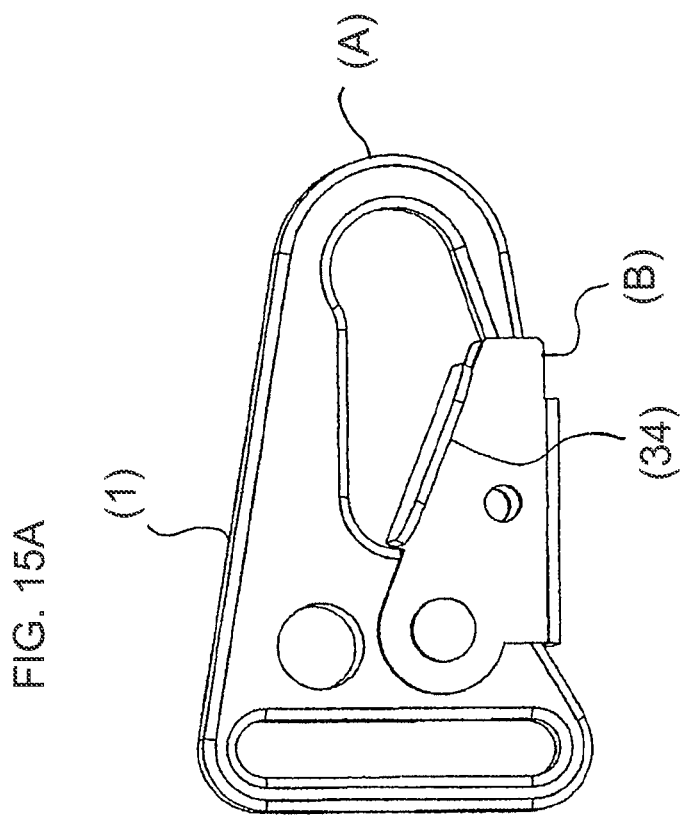
Figure 15B:
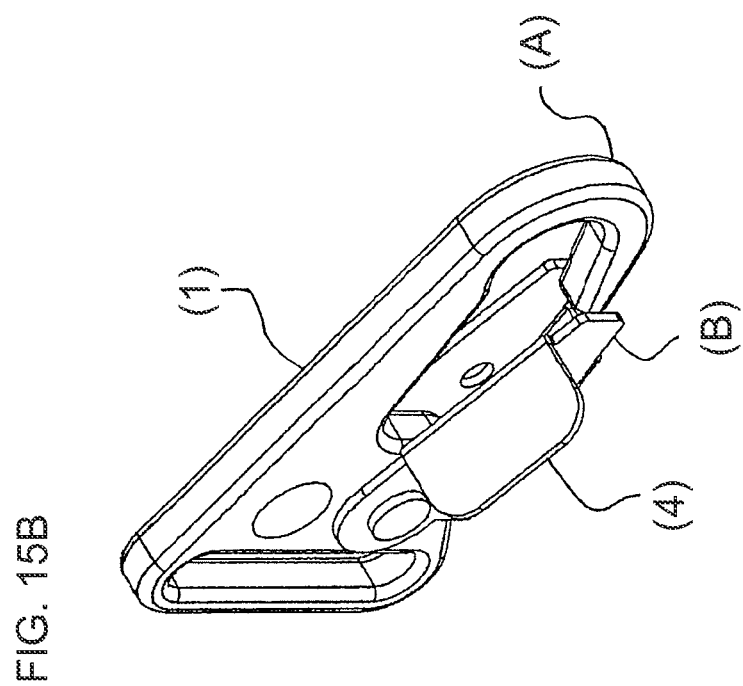
Figure 15C:
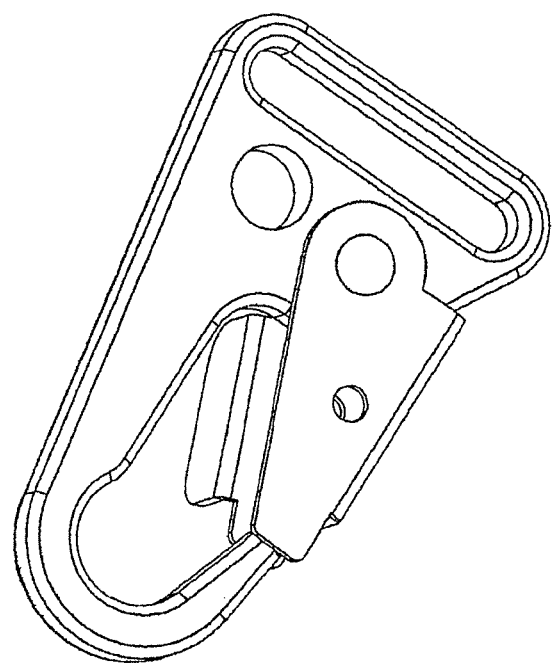
Figure 15E:
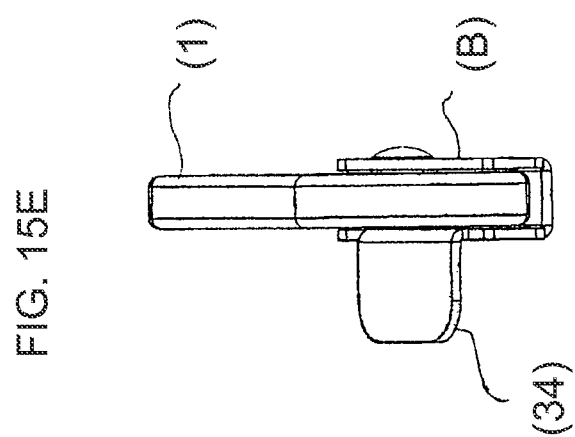

To alleviate these issues in the prior art, a removably coupled thumb tab actuator (3) is mounted to the snap-hook (1), as shown in FIGS. 3-4. The snap-hook (1) includes a lever (B), which pivots in a first plane (X) and has a lever aperture (C). The thumb tab actuator (3) includes a body (10), which has a surface (6) for engaging the lever (B), as well as a recessed aperture (D) and threaded aperture (E), which may be oriented in vertical planes parallel to the first plane (X), as shown more clearly in FIGS. 7, 10, and 11.

The body (10) also has a tab (4), which may be integrally formed with the body (10), that extends outwardly from the body (10) in a second plane (Y) transverse to the plane (X) in which the lever (B) pivots. In some embodiments, the plane (Y) in which the tab (4) extends is substantially perpendicular to the plane (X). In certain embodiments, the body (10) has a sidewall (8) that is substantially parallel to the plane (X) in which the lever (B) pivots, such that the tab (4) is also substantially perpendicular to the sidewall (8) of body (10). Depending on a user's handedness, the extending tab (4) may be oriented on either the left or right side of the thumb tab actuator (3).

The surface (6) for engaging the lever (B) can be any that is suitable to mount the body (10) to the lever (B). In an advantageous embodiment, the surface (6) for engaging the lever (B) is U-shaped to take advantage of the shape of the underside of the lever (B) of an HK style snap-hook. In other embodiments, the surface (6) may be V-shaped, concave, or otherwise suitably shaped to couple the thumb tab actuator (3) to the lever (B).

FIG. 3 illustrates the snap-hook (1) and the thumb tab actuator (3) in a non-coupled orientation and further illustrates the direction the thumb tab actuator (3) slides over the lever (B) in order to mount the thumb tab actuator (3) to the snap-hook (1). To couple the thumb tab actuator (3) and snap-hook (1), the recessed aperture (D) and threaded aperture (E) of the body (10) are first aligned with the lever aperture (C) of the lever (B). Once aligned, a screw (5) is passed through the recessed aperture (D), lever aperture (C), and threaded aperture (E), thereby coupling the body (10) and snap-hook (1) together, as shown more clearly in FIG. 4.

The screw (5) may be constructed of a suitable material, such as black oxide coated stainless steel, and may be a 4-40×7/16" phillips head, but other materials or screw types may also be used depending on particular applications. Any screw or fastener that sufficiently couples the body (10) to the lever (B) may be acceptable. In some embodiments, the body (10) is coupled to the lever (B) by just one screw. As noted above, the body (10) may include specially designed shapes, such as a U-shape, in order to produce a snug fit, such that additional fasteners are not necessary. However, in cases where the lever (B) of the snap hook includes more than one aperture, the thumb tab actuator (3) may be coupled to the lever (B) by more than one screw through a plurality of apertures in the body (10) and the lever (B), which can permit less secure mounting shapes than may otherwise be required.

It should be noted that, while the thumb tab actuator has been described as removably coupled to the snap-hook lever (B), in alternate embodiments, the thumb tab actuator (34) can instead be integrally formed with the lever (B), as shown in FIGS. 15A-F.

The operation of the device is shown in FIGS. 5A-B. A thumb (2) is placed underneath the extending tab (4), and the thumb (2) is used to exert a force on the underside of the extending tab (4), which in turn causes the lever (B) to open. This operation allows the thumb (2) to ride along the side of the snap-hook (1) instead of directly underneath the lever (B). This alleviates the problem of a user's thumb hindering the clearance area between the lever (B) and the hook (A), as was shown in FIG. 2.

The thumb tab actuator is composed of a suitable material, such as CNC machined 6061 T6 aluminum. Other sufficiently durable materials, including black oxide coated stainless steel, or other metals or plastics, may be selected. In advantageous embodiments, the material selected will provide a positive tactile feel in a variety of conditions, situations, or environments.

Referring now to FIGS. 6-12, the thumb tab actuator (3) is illustrated in a non-coupled configuration from a variety of views. As more clearly shown in FIGS. 6 and 12, the surface (6) of the body (10) forms a channel for engaging the lever (B). The extending tab (4) may extend from either the right side or the left side of the body (10), depending on the handedness of the user. In embodiments where the recessed aperture (D) and threaded aperture (E) are substantially centrally located in the body (10), the thumb tab actuator (3) may be reversed on the lever (i.e., reversing the sides on which the recessed aperture (D) and threaded aperture (E) are located), such that the actuator (3) is easily reconfigured from a left-handed orientation to a right-handed orientation (or vice versa). In another embodiment, as shown in FIGS. 13A-B, extending tabs (24, 26) extend from both the right and left sides of the body (10), resulting in an ambidextrous thumb tab actuator that can accommodate both right-handed and left-handed users.

As shown in FIGS. 7-11, the recessed aperture (D) is located in a portion of the thumb tab actuator (3) below the extending tab (4). The threaded aperture (E) is in a portion of the thumb tab actuator (3) opposite to the extending tab (4) and is horizontally aligned with the recessed aperture (D). The recessed aperture (D) is located on a portion of the thumb tab actuator (3) underneath the extending tab (4). A screw (5) passes through the threaded aperture (E) and the lever aperture (C) into the recessed aperture (D) to couple the thumb tab actuator (3) to the lever (B).

As shown in FIG. 14, this allows a snap-hook at the end of a sling (12) to easily attach to a firearm (14), such as a rifle. In this way, easy and rapid attachment and detachment of the sling can be accomplished.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A thumb tab actuator for a sling snaphook, comprising:
   a body having a surface that engages a lever of a snap-hook that pivots in a first plane;
   wherein the body is adapted to be removably mounted to the lever;
   wherein the body includes a tab extending outwardly in a second plane transverse to the first plane when the body is mounted to the lever, such that the lever pivots in response to a force exerted on the tab; and
   wherein the body includes a wall substantially parallel to the first plane and having a through hole that aligns with at least one through hole of the lever when mounted thereto for accommodating at least one fastener which extends through the through holes of the body and lever in a direction transverse to the first plane to secure the thumb tab actuator to the lever.

2. The thumb tab actuator of claim 1, wherein the extending tab is substantially perpendicular to the first plane.

3. The thumb tab actuator of claim 1, wherein the surface for engaging a lever of the snap-hook is substantially U-shaped.

4. The thumb tab actuator of claim 1, wherein the surface for engaging a lever of the snap-hook is concave.

5. The thumb tab actuator of claim 1, wherein the surface for engaging a lever of the snap-hook is substantially V-shaped.

6. The thumb tab actuator of claim 5, wherein an aperture is substantially centrally located on the body such that the body is mountable to the lever with the tab extending outwardly from the first plane on either side thereof.

7. The thumb tab actuator of claim 1, wherein the body includes a plurality of apertures for accommodating fasteners.

8. The thumb tab actuator of claim 1, wherein the body includes a first side and a second side, and wherein the tab is a first tab extending outwardly from the first side of the body, further comprising a second tab extending outwardly from the second side of the body transverse to the first plane when the body is mounted to the lever.

9. The thumb tab actuator of claim 8, wherein the second tab is substantially perpendicular to the first plane.

10. The thumb tab actuator of claim 1, wherein the body comprises aluminum.

11. The thumb tab actuator of claim 1, wherein the body comprises stainless steel.

12. The thumb tab actuator of claim 1, wherein the tab is integrally formed with the body.

13. The thumb tab actuator of claim 1, wherein the screw comprises a 4-40×7/16" Phillips head screw.

14. The thumb tab actuator of claim 1, wherein the body is reversibly mounted onto the lever of the snap-hook, such that the tab extends outwardly from a first side of the body when in a first position and from a second side of the body when in a second position.

15. A snap-hook comprising a hook that engages the lever with the thumb tab actuator of claim 1 mounted thereto, wherein the lever engages the hook when in a closed position, and wherein the lever pivots relative to the hook to an open position in response to a force exerted on the tab.

16. The snap-hook of claim 15, further comprising a first end and a second end, wherein the hook is located at the first end of the snap-hook, and the second end of the snap-hook is connected to a firearm sling.

17. The snap-hook of claim 16, wherein the first end of the snap hook is coupled to a firearm.

18. The snap-hook of claim 17, wherein the firearm is a rifle.

* * * * *